Feb. 4, 1958  H. C. HORTON  2,822,156
MINNOW PAIL AERIFIER
Filed Feb. 16, 1955
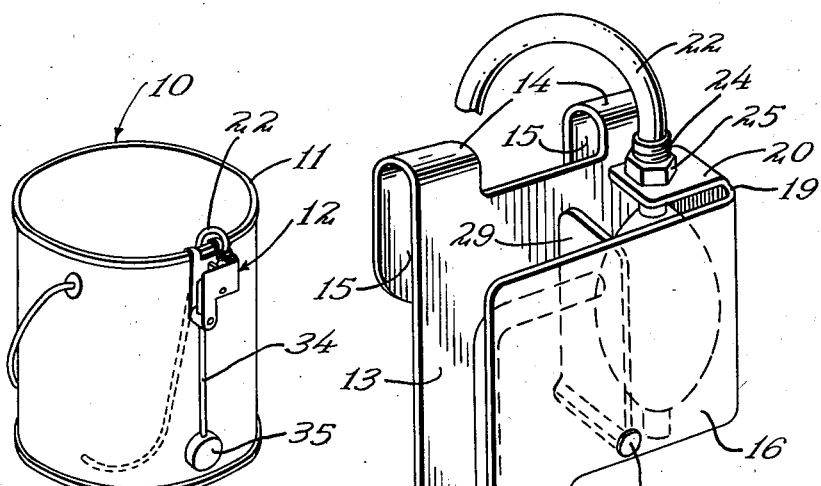
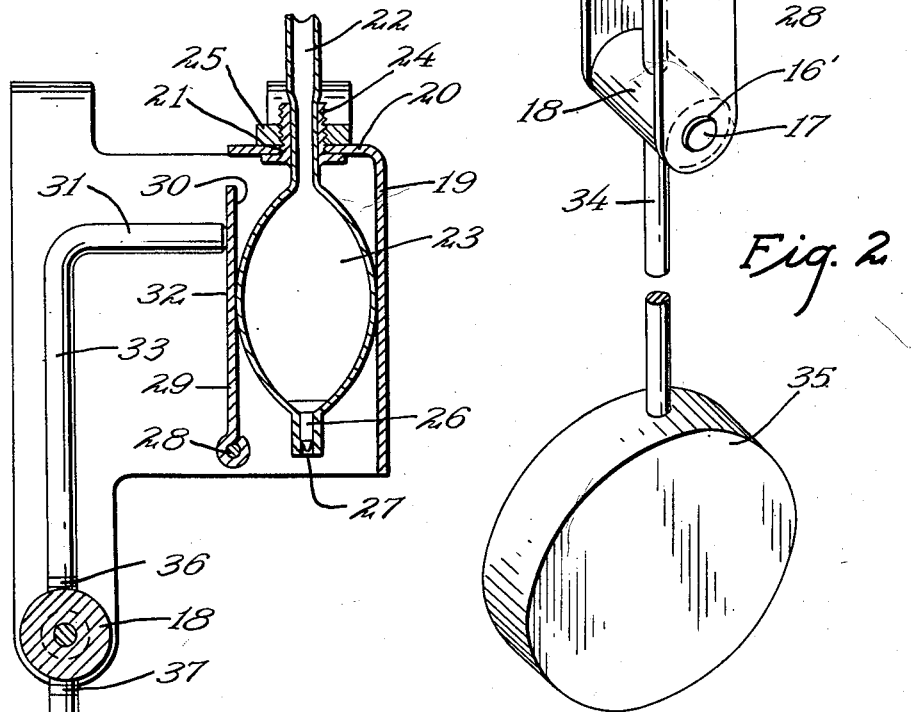
INVENTOR
Herbert C. Horton
BY Robert M. Dunning
ATTORNEY

United States Patent Office 2,822,156
Patented Feb. 4, 1958

2,822,156

MINNOW PAIL AERIFIER

Herbert C. Horton, St. Paul, Minn.

Application February 16, 1955, Serial No. 488,562

1 Claim. (Cl. 261—121)

This invention relates to aerating minnow pails. More particularly, the invention relates to an improved structure for keeping minnows alive by an automatically operable aerator when in combination with a transported and stationary minnow bucket.

The advantages of providing an aquarium, or other fish containing pool, with oxygen has long been exploited in the art. The devices for adding oxygen to the water have generally been electrically operable pumps or other devices requiring some available outside source of power which is not always accessible. In addition the problems of keeping minnows alive when confined to a minnow pail are well known. Usually a change of water at early and periodical intervals is necessary, or the minnow pail may be placed under a flowing stream of water in order to replace or keep fresh water in the pail. Another means of supplying oxygen to the water has been by the use of capsules or tablets, which are supposed to furnish fresh oxygen and keep the minnows alive, without the necessity of changing the water. Consequently, the problem of supplying a quantity of fresh oxygen from time to time in a minnow pail, by mechanical means, is quite difficult. The difficulty arises in that the minnow pail is transported in an automobile for great distances and then possibly transferred to a boat. Often times a change of water is harmful or fails to keep the minnows alive, or otherwise the water is not changed and the minnows die, often times despite the addition of pills or tablets.

Accordingly, it is the object of this invention to provide, for use in combination with a minnow pail, an aerator transportable therewith.

Another object of this invention is to provide a self operating aerator for use in combination with a minnow bucket.

An additional object of this invention is to provide, for use in combination with a movable container, an automatically operable aerator which is mountable on the side of the container and automatically pumps oxygen into the water by the motion of the container.

A further object of this invention is to provide an improved aerator of simple design and mechanically operable in combination with a minnow bucket to supply air to water contained in the bucket by the rocking motion of a boat.

Another object of this invention is to provide, in combination, an improved aerator for supplying oxygen to a confined body of water contained in a minnow bucket by the application of slight external forces of the hand or foot.

Further objects and advantages will be apparent from the following disclosure of the accompanying drawings wherein:

Figure 1 is a perspective of the aerator, applied to a minnow bucket, as embodied in this disclosure.

Figure 2 is a side perspective showing internal structure details of my aerator in dotted lines.

Figure 3 is a partial cross sectional view of the structure shown in Figures 1 and 2 and with one side removed.

With reference to the drawings, like parts will be similarly indicated.

In Figure 1 there is shown a conventional type minnow pail 10 provided with or having supporting upon its rim an aerator 12. The aerator 12 consists of a back plate 13 having the upper ears 14 folded back and downwardly to provide a pair of tongues 15 which clamp or hold the aerator 12 on the rim 11 of pail 10.

A face plate 16 provided, for example, with aperture 16' is thereby mounted on pintle 17. The pintle 17 is supported at its opposite end in a suitable aperture in the plate 13. The respective ends of the pintle are peened or otherwise riveted to the plates 13 and 16. A rotatable spacer sleeve 18 is provided about the pintle 17. The pintle 17 and sleeve 18 provide spacing between, and support for, plates 13 and 16.

A back wall 19 formed, for example, by a right angle bend in the plate 16 is provided with a flange 20. The flange 20 is a right angular bend of the wall section 19 which overlies the space between the plates 13 and 16. This flange 20 is provided with an aperture 21 through which a tube 22 extends, supporting a flexible rubber bulb 23. The tube 22 and bulb 23 are supported by the flange 20 and are held in aperture 21 by an externally threaded sleeve 24. A nut 25 turns down on threaded sleeve 24 to bear against flange 20 and clamps these parts together. The wall 13, back wall 19, flange 20, supporting ears 14, tongues 15 and wall 16 are preferably an integral stamped piece folded to form the frame structure described. Otherwise, the frame elements may be separate parts bolted or welded together to form the mounting frame.

The air bulb 23 is provided at its base with a conventional air valve 26 in the opening 27. The flexible air pumping bulb 23 is of a conventional character provided with a tubular outlet 22 at one end and an air intake valve 26 at the opposite end.

Supported on a pintle 28 is a leaf or flap 29 having its one face portion 30 pressed and pushed against the side of bulb 23 by arm 31. The arm 31 normally lies in resting and pushing relationship against face 32 of leaf 29. The pintle 28 suporting the leaf 29 is fastened between plates 13 and 16 in a manner similar to pintle 17 and likewise provides additional support and spacer means for the plates 13 and 16.

The arm 31 is formed by a right angular bend in the depending rod 33, supported by spacer 18, and effects compressive collapse of the bulb 23 when rocked against leaf 29, as hereinafter explained. When arm 31 is withdrawn from leaf 29 the bulb 23 automatically returns to normal shape pulling in air through valve 26.

The rod 33, supported by spacer 18, extends as a continuation into rod 34 carrying a heavy pendulum 35. The rods 33 and 34 may be an intgeral part of spacer 18 or secured therein by suitable screw threads 36 and 37, respectively, as desired. The spacer 18, as indicated, is mounted to freely rotate on the pintle 17 so that as pendulum 35 is shifted about, as by the waves rocking a boat or carrying of the pail, leaf 29 depresses bulb 23 to force air through tube 22 into the minnow pail 10. A rocking of the pendulum 35 in an opposite direction or in the direction which withdraws the arm 31 from leaf 29 causes a normal intake of air by the bulb through the valve 26. Thus it will be recognized that in the arrangement provided there is caused an automatic supply of oxygen furnished to the water in a minnow pail by the rocking of a boat or the motion of transportation.

From the above disclosure it will be recognized that when a pail is motionless the foot may be used to gently push or move the pendulum to cause depression and expansion of the bulb, forcing air into the minnow pail 10. Otherwise, as it is well known, a continuous flow of air is not necessary, the pendulum may be occasionally swung by hand or pushed by the foot to occasionally replenish the minnow pail with a supply of oxygen.

In accordance with the patent statutes, I have described the principles of construction and operation of my minnow pail aerifier, and while I have endeavored to set forth the best embodiment thereof, I desire to have it understood that obvious changes may be made within the scope of the following claim without departing from the spirit of my invention.

I claim:

An aerator for automatically supplying air to the water in a container by the motion of the container comprising a framework formed of parallel side pieces, a pair of spacing means between said side pieces, attaching means for fastening said framework to the top side rim of a container, rotatable sleeve means on one of said spacer means, a flexible air pumping bulb mounted in said framework, an air outlet conduit attached to said bulb, a pivotal plate mounted on another of said spacer means adjacent said bulb, a rocking arm mounted on said rotatable sleeve and operable to force said pivotal plate against said bulb to thereby contract the bulb forcing air through said air outlet conduit, and pendulum means depending from said rotatable sleeve to rock said rocking arm against and away from said pivotal plate to produce the pumping action of said flexible air pumping bulb.

References Cited in the file of this patent

UNITED STATES PATENTS

| | | |
|---|---|---|
| 1,325,773 | Babendreer | Dec. 23, 1919 |
| 2,552,261 | Coughlin | May 8, 1951 |
| 2,636,308 | Demmer | Apr. 28, 1953 |
| 2,664,241 | Sunday | Dec. 29, 1953 |
| 2,689,428 | Stosberg et al. | Sept. 21, 1954 |